(12) United States Patent
Aoki et al.

(10) Patent No.: US 6,985,624 B2
(45) Date of Patent: Jan. 10, 2006

(54) IMAGE PROCESSING APPARATUS AND ITS METHOD

(75) Inventors: Koji Aoki, Kanagawa (JP); Yoshiyuki Takagi, Kanagawa (JP); Motohisa Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 10/216,766

(22) Filed: Aug. 13, 2002

(65) Prior Publication Data

US 2003/0039393 A1    Feb. 27, 2003

(30) Foreign Application Priority Data

Aug. 21, 2001   (JP)   ............... 2001-250408

(51) Int. Cl.
*G06K 9/66* (2006.01)
*G06K 9/60* (2006.01)

(52) U.S. Cl. ................. 382/195; 382/305
(58) Field of Classification Search ........... 382/173, 382/176, 195, 305, 233; 358/1.9, 429; 707/526, 707/528, 529; 345/581; 708/525; 709/101; 711/163

See application file for complete search history.

(56) References Cited

U.S. PATENT DOCUMENTS

| | | | | |
|---|---|---|---|---|
| 6,021,476 A | * | 2/2000 | Segars | ............... 711/163 |
| 6,334,135 B2 | * | 12/2001 | Kabuo | ............... 708/525 |
| 6,825,849 B1 | * | 11/2004 | Minakuchi et al. | ......... 345/581 |
| 2002/0033969 A1 | * | 3/2002 | Nakanishi et al. | .......... 358/429 |
| 2002/0099755 A1 | * | 7/2002 | Kubooka et al. | ........... 709/101 |
| 2003/0030829 A1 | * | 2/2003 | Kagawa | .................... 358/1.9 |
| 2003/0039393 A1 | * | 2/2003 | Aoki et al. | ................ 382/176 |

* cited by examiner

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

An image processing apparatus and its method which easily change the definition of pixel attribute in an image processing unit even if the image processing unit has been realized by hardware such as a semiconductor integrated circuit. The image processing apparatus inputs image data and first pixel information indicating information on a pixel of the image data. A first selector 101 selects predetermined bits from the first pixel information and generates second pixel information. A second selector 103 selects one of the plural third pixel information stored in a register file 102 based on the second pixel information and outputs the selected third pixel information as fourth pixel information. A decoder 104 determines a pixel attribute based on the fourth pixel information. Then, image processing is performed on the image data based on the determined pixel attribute. At this time, the selection bits by the first selector and the data stored in the register file 102 are variable.

12 Claims, 5 Drawing Sheets

IMAGE PROCESSING APPARATUS AND ITS METHOD

FIELD OF THE INVENTION

The present invention relates to an image processing apparatus and its method for image processing in correspondence with attribute information per pixel.

BACKGROUND OF THE INVENTION

In a known image processing technique, a high quality image is obtained by performing image processing on image data based on pixel attribute per pixel. The pixel attribute is pixel additional information indicating, for example, whether the pixel to be image processed belongs to a character area or a photographic area. A pixel having a character attribute is subjected to image processing for character, while a pixel having a photograph attribute, to image processing for photograph. In this manner, optimum image processing is performed in correspondence with pixel attribute.

Hereinbelow, the conventional construction for image processing in correspondence with pixel attribute will be described with reference to FIG. 5.

In FIG. 5, an image processing apparatus comprises m image processors 301, 302, . . . , and 303. In each image processing unit, a predetermined pixel attribute is referred to, and image processing corresponding to the pixel attribute is performed. That is, the image processing units refer to respectively different pixel attributes.

In the figure, an input image is first subjected to image processing based on a pixel attribute 1 by the image processing unit 301. The output from the image processing unit 301 is inputted into the image processing unit 302 and similarly subjected to image processing based on a pixel attribute 2. Hereinafter, through image processing based on the predetermined pixel attributes, the image is finally subjected to image processing based on pixel attribute 3 and pixel attribute 4 by the image processing unit 303.

Accordingly, as a finally-obtained output image, a high quality image appropriately reflecting attributes of respective pixels is obtained.

However, the above conventional image processing apparatus has the following problems.

In the image processing apparatus in FIG. 5, in a case where the pixel attribute to be referred to in the image processing unit 301 is changed from the pixel attribute 1 to, for example, the pixel attribute 2, or image processing is performed based on the result of calculation between the pixel attribute 1 and the pixel attribute 3 will be studied, if the image processing unit 301 is already realized by hardware as e.g. a semiconductor integrated circuit, change in connection or the like or addition of calculation circuit are difficult. Accordingly, such correction cannot be made.

Further, in a case where product specifications are uncertain in the middle of product development, as development of the image processing unit for processing based on pixel attribute cannot be started, the entire development schedule is delayed.

SUMMARY OF THE INVENTION

The present invention has been made to solve the above problems, and has its object to provide an image processing apparatus and its method for easily changing definition of pixel attribute in an image processing unit.

According to one aspect of the present invention, the foregoing object is attained by providing an image processing apparatus comprising: input means for inputting image data and first pixel information indicating information on a pixel of the image data; first selection means for selecting predetermined bits from the first pixel information to generate second pixel information; storage means for storing plural third pixel information; second selection means for selecting one of the plural third pixel information stored in the storage means based on the second pixel information to output selected third pixel information as fourth pixel information; pixel attribute determination means for determining a pixel attribute based on the fourth pixel information; and image processing means for performing image processing on the image data based on the pixel attribute determined by the image attribute determination means.

According to another aspect of the present invention, the foregoing object is attained by providing an image processing method comprising: an input step of inputting image data and first pixel information indicating information on a pixel of the image data; a first selection step of selecting predetermined bits from said first pixel information to generate second pixel information; a storage step of storing plural third pixel information into storage means; a second selection step of selecting one of said plural third pixel information stored in said storage means based on said second pixel information to output selected third pixel information as fourth pixel information; a pixel attribute determination step of determining a pixel attribute based on said fourth pixel information; and an image processing step of performing image processing on said image data based on the pixel attribute determined at said image attribute determination step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
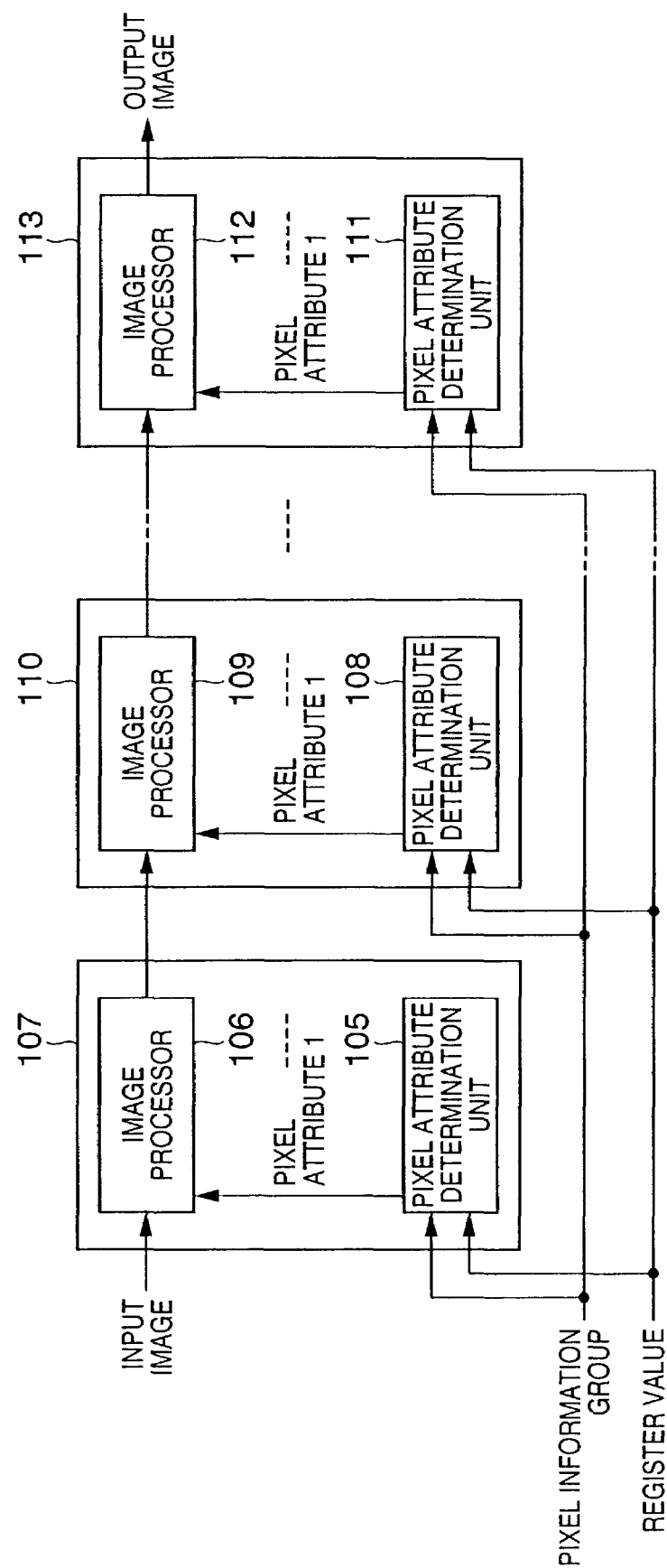
FIG. 1 is a block diagram showing the basic construction of image processing apparatus according to a first embodiment of the present invention.

FIG. 1 is a block diagram showing the basic construction of image processing apparatus according to a first embodiment of the present invention. As shown in FIG. 1, the image processing apparatus of the present embodiment has image processing units 107, 110, . . . , and 113, into which input image data, pixel information group and a register value are respectively inputted. The image processing units 107, 110, . . . , and 113 respectively have an image processor and pixel attribute determination unit.

Next, an operation in the image processing unit 107 will be described. Note that similar operations are made in the other image processing units.

Figure 2:
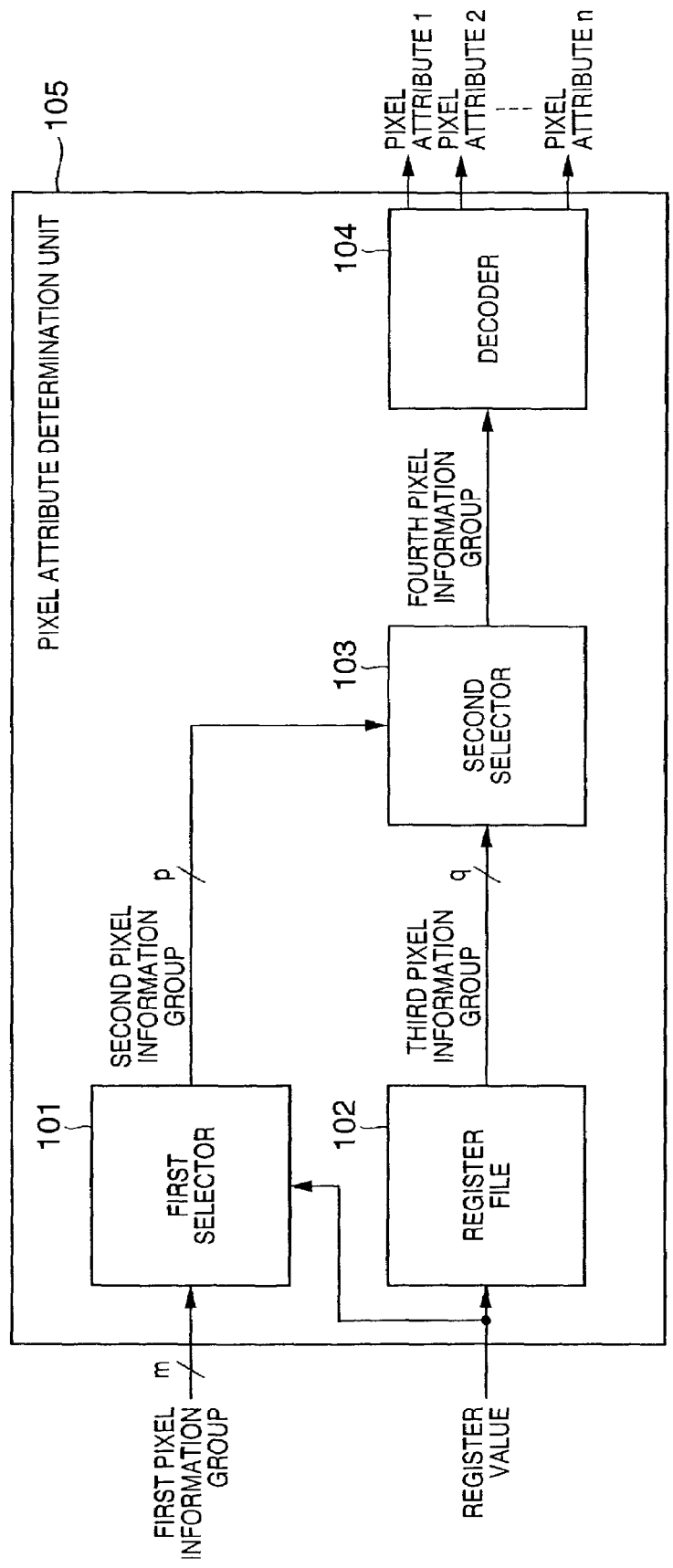
FIG. 2 is a block diagram showing the construction of pixel attribute determination unit in FIG. 1.

FIG. 2 is a block diagram showing the detailed construction of a pixel attribute determination unit 105 in the image processing unit 107. In FIG. 2, a first pixel information group inputted into the pixel attribute determination unit 105 is an m-bit signal. A first selector 101 extracts arbitrary p bits as a second pixel information group from the m-bit signal.

In this arrangement, even if positions of pixel attributes defined in each bit of the m bits constructing the first pixel information group are changed due to some reasons, the first selector 101 extracts only appropriate bits from the m-bit signal. The selection by the first selector 101 is made based on the register value set in a register (not shown).

Next, the p-bit second pixel information group outputted from the first selector 101 is inputted as a selection signal into a second selector 103. The second selector 103 selects one of third pixel information group stored in a register file 102. Note that the contents of the register file 102 are rewritable by the register value set in the register (not shown). Assuming that the bit width of the second pixel information group is p bits, the depth of address of the register file 102 is $2^p$ or less.

The q-bit information selected from the third pixel information group by the second selector 103 is inputted into a decoder 104, and converted to pixel attributes specific to the respective image processors.

In this manner, in the pixel attribute determination unit 105, information corresponding to the first pixel information group is selected from plural information stored in the register file 102, and plural pixel attribute signals used in the respective image processings are generated.

Hereinbelow, pixel attribute generation processing in the present embodiment will be described in more detail with reference to FIG. 3. For the sake of simplicity of explanation, one image processor performs different three types of image processings (pixel attributes 1 to 3).

Figure 3:
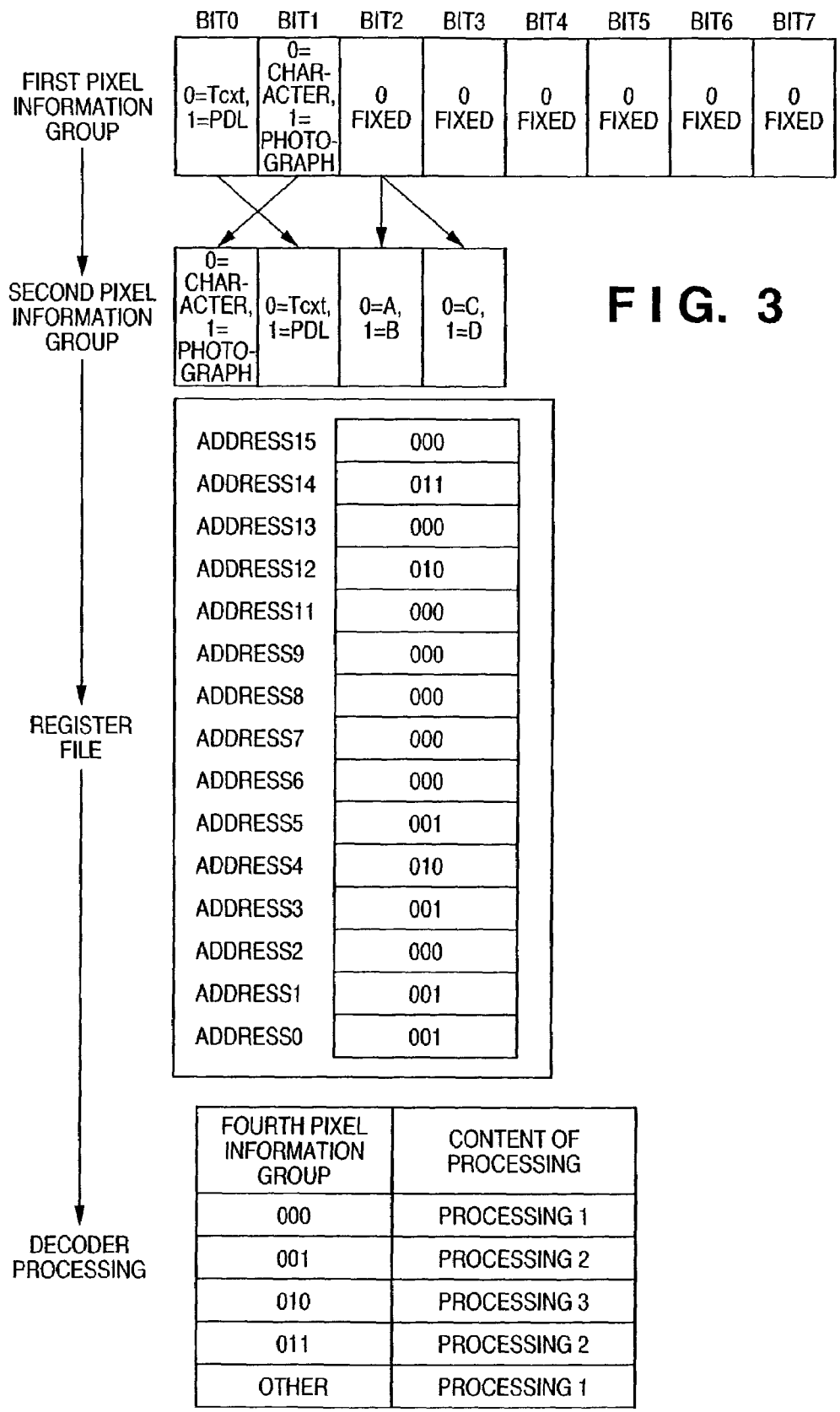
FIG. 3 is an explanatory diagram showing the process of pixel attribute determination processing according to the first embodiment of the present invention.

FIG. 3 shows the process of pixel attribute generation in the pixel attribute determination unit 105 having the construction shown in FIG. 2. In this example, the first pixel information group is 8-bit information, in which a bit 0 indicates Text/PDL, and a bit 1, character/photograph, and the other bits are fixedly set to 0.

First, the first selector 101 selects a 4-bit signal constructing the second pixel information group from the first pixel information group based on the value of the register (not shown).

The register file 102 holds four values "000", "001", "010" and "011" as the third pixel information group at addresses 0 to 15. The second selector 103 selects one of the four values based on the value of the second pixel information group, and outputs the selected value as the fourth pixel information group. More particularly, the selection is performed based on the 4-bit signal of the second pixel information group as an address signal for the register file 102.

Then the decoder 104 exclusively selects one of processing 1 (pixel attribute 1), processing 2 (pixel attribute 2) and processing 3 (pixel attribute 3) as image processing to be performed on the pixel based on the selected fourth pixel information group. The image processor 106 performs the selected image processing as an optimum image processing for the pixel.

As described above, according to the present embodiment, even if the first pixel information group or definition of information group has been changed, the image processing unit can be changed in correspondence with the above change in a flexible manner by changing the selection method by the first selector 101 or rewriting the contents of the register file 102. That is, it is possible to select arbitrary bits from the plural-bit pixel information group and change determination of pixel attribute added to each pixel by software setting.

By this arrangement, even when product specifications are uncertain, image processor applicable to plural product specifications can be developed.

Note that the selectors and the register file of the present embodiment may be changed for each apparatus or may be changed for each processing. Accordingly, as an image processing method can be changed in block units or page units, high quality image data can be generated.

<Second Embodiment>

Hereinbelow, a second embodiment of the present invention will be described.

Figure 4:
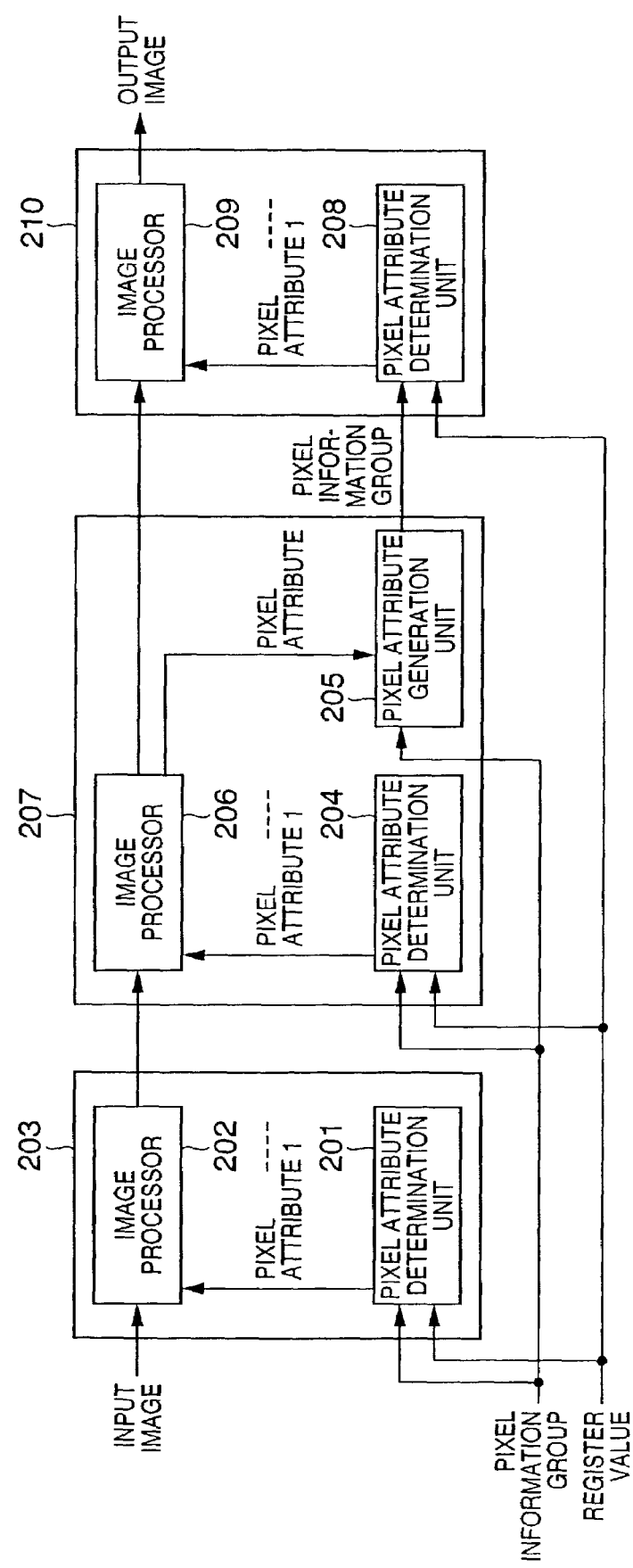
FIG. 4 is a block diagram showing the basic construction of the image processing apparatus according to a second embodiment of the present invention.
Figure 5:
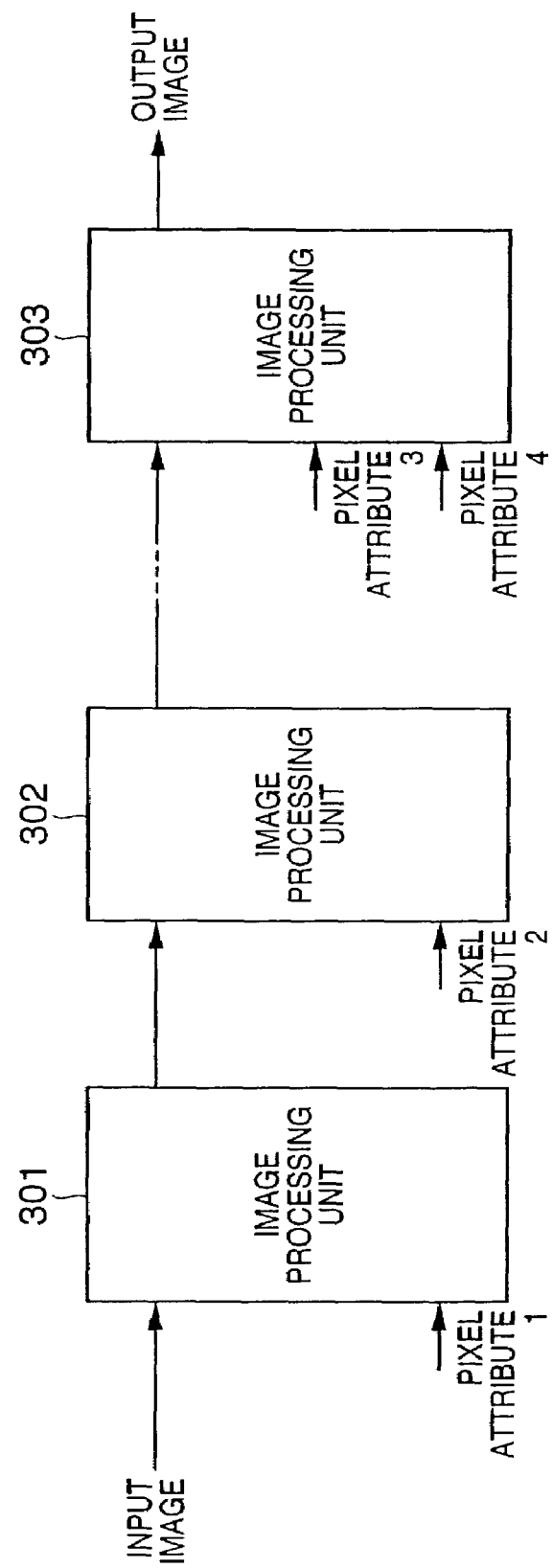
FIG. 5 is a block diagram showing the construction of the conventional image processing apparatus for image processing in correspondence with pixel attribute.

FIG. 4 is a block diagram showing the basic construction of the image processing apparatus according to the second embodiment of the present invention. As shown in FIG. 4, the image processing apparatus of the present embodiment has image processors 203, 207 and 210, into which input image data, pixel information and a register value are inputted. The image processing units 203, 207 and 210 respectively have an image processor and a pixel attribute determination unit. As in the case of the respective image processing units in the above-described first embodiment, the image processing units 203 and 210 perform image processing based on a pixel attribute determined by the pixel attribute determination unit.

In the second embodiment, the image processing unit 207 further has a pixel attribute generator 205, for generating a new pixel attribute in addition to the processing in the first embodiment.

In the image processing unit 207, an image processor 206 performs the image processing as described in the first embodiment and newly generates a pixel attribute. The generated pixel attribute is inputted, with input pixel information group, into the image attribute generator 205.

In the pixel attribute generator 205, a part of the input pixel information group is overwritten with the newly generated pixel attribute or with the result of calculation between some of the input pixel information group and the newly generated pixel attribute.

By the above processing, the pixel information group outputted from the image processing unit 207 through the pixel attribute generator 205 is inputted, with the output image data, into the image processing unit 210, in which the processing as described in the first embodiment is performed. That is, in a pixel attribute determination unit 208 in the subsequent image processing unit 210, the pixel information group generated by the pixel attribute generator 205 is referred to in place of the first pixel information group.

Note that in the second embodiment, one image processing unit having the pixel attribute generator is employed, however, plural image processing units respectively having a pixel attribute generator may be provided. Further, the number of image processing units in the apparatus is not limited to three as shown in FIG. 4.

As described above, according to the second embodiment, a pixel attribute is determined in an image processing unit in correspondence with a pixel attribute newly generated in a previous image processing unit. In addition to the advantage obtained in the above-described first embodiment, more detailed settings can be made in correspondence with more complicated image processing.

[Other Embodiment]

Note that the present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for realizing the functions of the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire actual processing in accordance with designations of the program code and realizes functions of the above embodiments.

As described above, according to the present invention, the definition of pixel attribute in an image processing unit can be easily changed.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   input means for inputting image data and first pixel information indicating information on a pixel of the image data;
   first selection means for selecting predetermined bits from the first pixel information to generate second pixel information;
   storage means for storing plural third pixel information;
   second selection means for selecting one of the plural third pixel information stored in said storage means based on the second pixel information to output selected third pixel information as fourth pixel information;
   pixel attribute determination means for determining a pixel attribute based on the fourth pixel information; and
   image processing means for performing image processing on the image data based on the pixel attribute determined by said image attribute determination means.

2. The image processing apparatus according to claim 1, wherein said first selection means selects the predetermined bits from the first pixel information based on a register value.

3. The image processing apparatus according to claim 2, wherein the register value is variable.

4. The image processing apparatus according to claim 1, wherein the plural third pixel information stored in said storage means are variable.

5. The image processing apparatus according to claim 1, wherein said first selection means, said storage means, said second selection means, said pixel attribute determination means and said image processing means constitute an image processing unit,
   and wherein said apparatus has a plurality of said image processing units.

6. The image processing apparatus according to claim 5, wherein parameters in said respective means can be set independently in said plural image processing units.

7. The image processing apparatus according to claim 6, wherein in one of said plural image processing units,
   said image processing means further has pixel attribute generation means for generating new pixel attribute information to generate fifth pixel information based on the new pixel attribute information and the first pixel information,
   and wherein the fifth pixel information is inputted in place of the first pixel information into another image processing unit.

8. An image processing method comprising:
   an input step of inputting image data and first pixel information indicating information on a pixel of the image data;
   a first selection step of selecting predetermined bits from the first pixel information to generate second pixel information;
   a storage step of storing plural third pixel information into storage means;
   a second selection step of selecting one of the plural third pixel information stored in the storage means based on the second pixel information to output selected third pixel information as fourth pixel information;
   a pixel attribute determination step of determining a pixel attribute based on the fourth pixel information; and
   an image processing step of performing image processing on the image data based on the pixel attribute determined in said image attribute determination step.

9. The image processing method according to claim 8, wherein in said first selection step, the predetermined bits are selected from the first pixel information based on a register value.

10. The image processing method according to claim 9, wherein the register value is variable.

11. The image processing method according to claim 8, wherein the plural third pixel information stored in the storage means are variable.

12. A computer-readable storage medium holding a program for controlling an image processing apparatus, for executing:
- an input step of inputting image data and first pixel information indicating information on a pixel of the image data;
- a first selection step of selecting predetermined bits from the first pixel information to generate second pixel information;
- a storage step of storing plural third pixel information into storage means;
- a second selection step of selecting one of the plural third pixel information stored in the storage means based on the second pixel information to output selected third pixel information as fourth pixel information;
- a pixel attribute determination step of determining a pixel attribute based on the fourth pixel information; and
- an image processing step of performing image processing on the image data based on the pixel attribute determined in said image attribute determination step.

* * * * *